Nov. 11, 1969   F. JAKOB   3,477,918

HIGH PRESSURE VAPOR COMPRESSION DISTILLATION

Filed Aug. 22, 1967   3 Sheets-Sheet 1

INVENTOR
FRITZ JAKOB
BY *J. William Miller*
ATTORNEY

INVENTOR
FRITZ JAKOB 3,477,918
HIGH PRESSURE VAPOR COMPRESSION
DISTILLATION
Fritz Jakob, near Wolfratshausen, Germany, assignor to
Linde Aktiengesellschaft, Wiesbaden, Germany
Filed Aug. 22, 1967, Ser. No. 662,372
Claims priority, application Germany, Aug. 22, 1966,
L 54,369
Int. Cl. C02b 1/06; B01d 3/00
U.S. Cl. 203—11                                    12 Claims

ABSTRACT OF THE DISCLOSURE

Vapor compression distillation, at pressures of 80–200 atmospheres, is employed for desalination of sea water and the like.

---

This invention relates to separatory distillation, and in particular to a system wherein vapor withdrawn from the distillation zone is compressed and then indirectly heat exchanged with raw liquid entering said zone; said systems are commonly designated as "vapor compression" systems.

Although many types of distillation processes have been described and used, only two of these processes, namely, the flash vaporization and vapor compression, have obtained wide acceptance for the purpose of producing fresh water from sea water. These processes are normally conducted at pressures of about 0.1–4 atmospheres absolute.

There is another well-known process for the desalination of sea water, the so-called "critical pressure process," wherein pressures are employed bordering on or above the critical pressure of the water. However, this process can hardly be characterized as a distillation process, as the separating effect is based on a phenomenon occurring at the critical pressure and far above the critical temperature.

In any case, the economics of obtaining fresh water from sea water is of vital importance, a great deal of effort being presently expended towards the goal of narrowing the differential between the cost of reservoir water and separated water.

It is thus a principal object of this invention to modify the conventional vapor compression distillation technique in order to improve the economics thereof, particularly as it is applied to the separation of fresh water from sea water and the like.

Upon further study of the specification and claims, other objects and advantages of the present invention will become apparent.

In essence, the above objects are attained by conducting the process at pressures of 80–200, more preferably 150–170, and most advantageously 155–165 atmospheres absolute.

By operating at these pressures, it has been unexpectedly discovered that the energy requirement, as well as the amount of sea water to be processed, are substantially lower than in the known manner of operating the process. The novel process can also be advantageously employed in multistage operation. In this case, the vaporizer-condenser, in a plant having $n$ stages, need only condense $1/n$ of the produced amount of fresh water in the form of vapor. The necessary compression ratio, however, is correspondingly higher.

Figure 1:
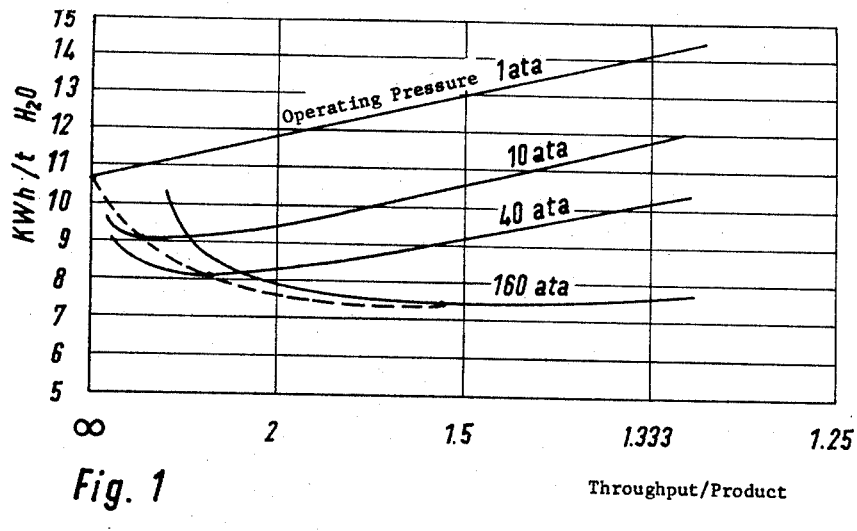
FIGURE 1 is a graph plotting the work per metric ton of fresh water produced from sea water, as a function of the weight ratio of raw sea water (throughput) to fresh water (product) of the plant at various operating pressures.

It can be seen from the bottom 3 curves of FIGURE 1, that the specific energy requirement, at constant operating pressure, first decreases and, after reaching a minimum value, increases again, the higher the pressure, the lower the minimum. If the minima are connected, a new curve is obtained which appears to asymptote at about 7.5 kwh./t. of fresh water. The importance of the very high pressures of this invention is then evident from the fact that the minimum of the 160 atmospheres curve is very close to this asymptotical value.

High pressure not only exerts a favorable influence upon the precise position of the minimum, but there is also obtained a very flat slope of the curve near the minimum value. Thus, even though the minimum value of the 160 atmospheres absolute curve is obtained at a ratio of throughput: product of 1.5, this ratio can be reduced to 1.33 without a substantial increase in the energy requirements. This means that the yield of fresh water can be raised from 67% to 75% at substantially optimum energy requirements. Consequently, this invention represents a considerable improvement compared to the previous processes which are generally operated at a yield of about 10 to 50%.

From the stand point of overall economics the cost of the water produced can be calculated on about one half compared to the cost of water from a low pressure plant, under circumstances otherwise equal.

Figure 2:
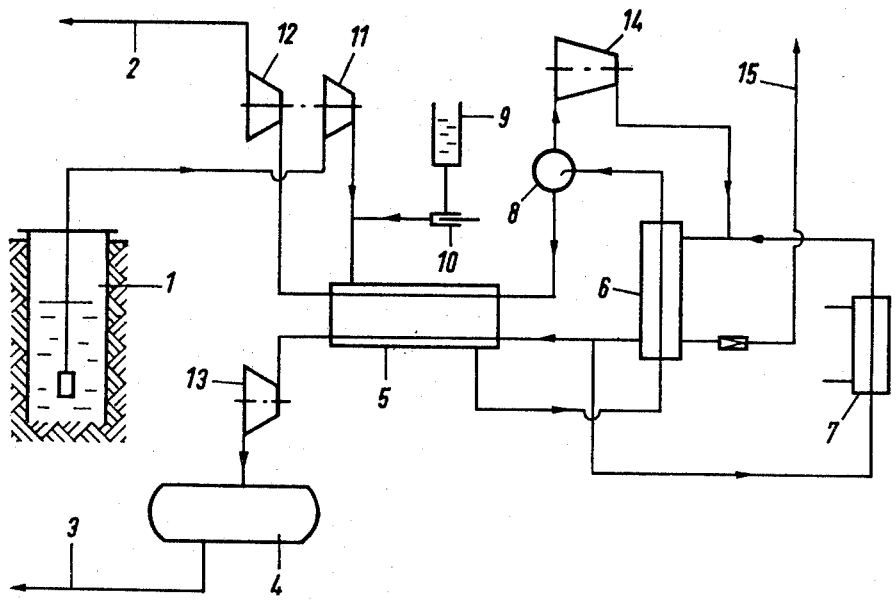
FIGURE 2 is a schematic representation of a preferred embodiment of this invention, wherein fresh water is produced from sea water in a one-stage plant.

For the purposes of simplicity, a one-stage process is illustrated in FIGURE 2. From the salt water source 1, filtered sea water is withdrawn at a rate of 220 m.³/hr. by the high pressure pump 11 and brought to the pressure employed in the process, ranging according to the invention between 80 and 200 atmospheres absolute and in this case, 160 atmospheres absolute. From there, the sea water passes to the heat exchanger 5 wherein it is heated to about boiling temperature. From there it is passed to vaporizer-condenser 6, wherein the sea water is partially vaporized, i.e., about 75%. The resultant liquid-vapor mixture is then conducted into the phase separator 8 where the vapor is separated from the salt-enriched residual brine.

The brine from phase separator 8 is reversed through heat exchanger 5, releasing the larger portion of its sensible heat to the sea water. After the brine is cooled to about ambient temperature, it is engine-expanded in turbine 12 to atmospheric pressure, and then returned to the ocean at a suitable location through pipeline 2.

The vapor withdrawn from the separator 8 is drawn into compressor 14 and compressed to a pressure at which the boiling temperature of the pure water is higher than that of the salt water by a temperature difference sufficient for effecting heat exchange, i.e., a $\Delta T$ of about 5 to 10° C. The resulting pressure relationship is about 1.1. The heat of condensation in condensing the compressed vapor in the vaporizer-condenser 6 effects the vaporization of the salt water on the vaporizer side. The fresh water produced by condensation is also reversed through the heat exchanger 5, leaving at about ambient temperature. Thereafter, the cooled fresh water is pressure-reduced to the pressure of storage tank 4 by passing through the turbine 13. It is then passed into the water distribution system via line 3.

Since the energy introduced into the system by way of the vapor compressor 14 cannot completely compensate for heat losses due to a finite ΔT and imperfect insulation, a portion, preferably about 0.5 to 2%, of the condensate is branched off downstream of the vaporizer-condenser 6, and is vaporized in the evaporator 7 by make-up external heat, and is recycled into the vaporizer-condenser 6. To provide for the purging of non-condensible dissolved gases present in the sea water, the condenser side of the vaporizer-condenser 6 is provided with purge line 15 containing a pressure reducing valve for releasing the gases to atmospheric pressure.

As known, scale from the calcium sulfate and carbonate present in sea water must be eliminated to avoid fouling the heat exchange surfaces. For preventing such scale formation, many techniques have been described. For example, in FIGURE 2, a solution named "Admirality Evaporator Compound" a mixture of 0.002% ethylenediamine tetraacetic acid, 0.005% sodium dinaphthyl methane and 0.005% polyethylene glycol is continuously fed from the container 9 into the sea water via the metering pump 10. This solution functions so as to loosen the normally tenaciously bound precipitate on the heat exchange surfaces so that the precipitate becomes dislodged and is scavenged by the fast-flowing liquid.

For larger plants, it is advantageous to conduct the heat exchange in two parallel paths, namely, sea water/brine and sea water/fresh water, and to divide the process into several successive stages. In this connection, it is advantageous to engine-expand the brine or the fresh water after each stage to a pressure just about boiling conditions of the liquid, preferably not more than about 2 atmospheres above the boiling pressure. The expansion energy of each stage is advantageously utilized in a coupled pump-turbine assembly for increasing the pressure of the sea water. In this manner, the pressure difference between ambient pressure and boiling pressure is distributed in all liquid streams across the entire series of heat exchangers, whereby the economics of the process are improved. (By "expansion energy" as it refers to liquid being pressure reduced in a turbine, this is the external work done by the fluid, and is not significantly reflected by any expansion of the liquid.)

Figure 3:
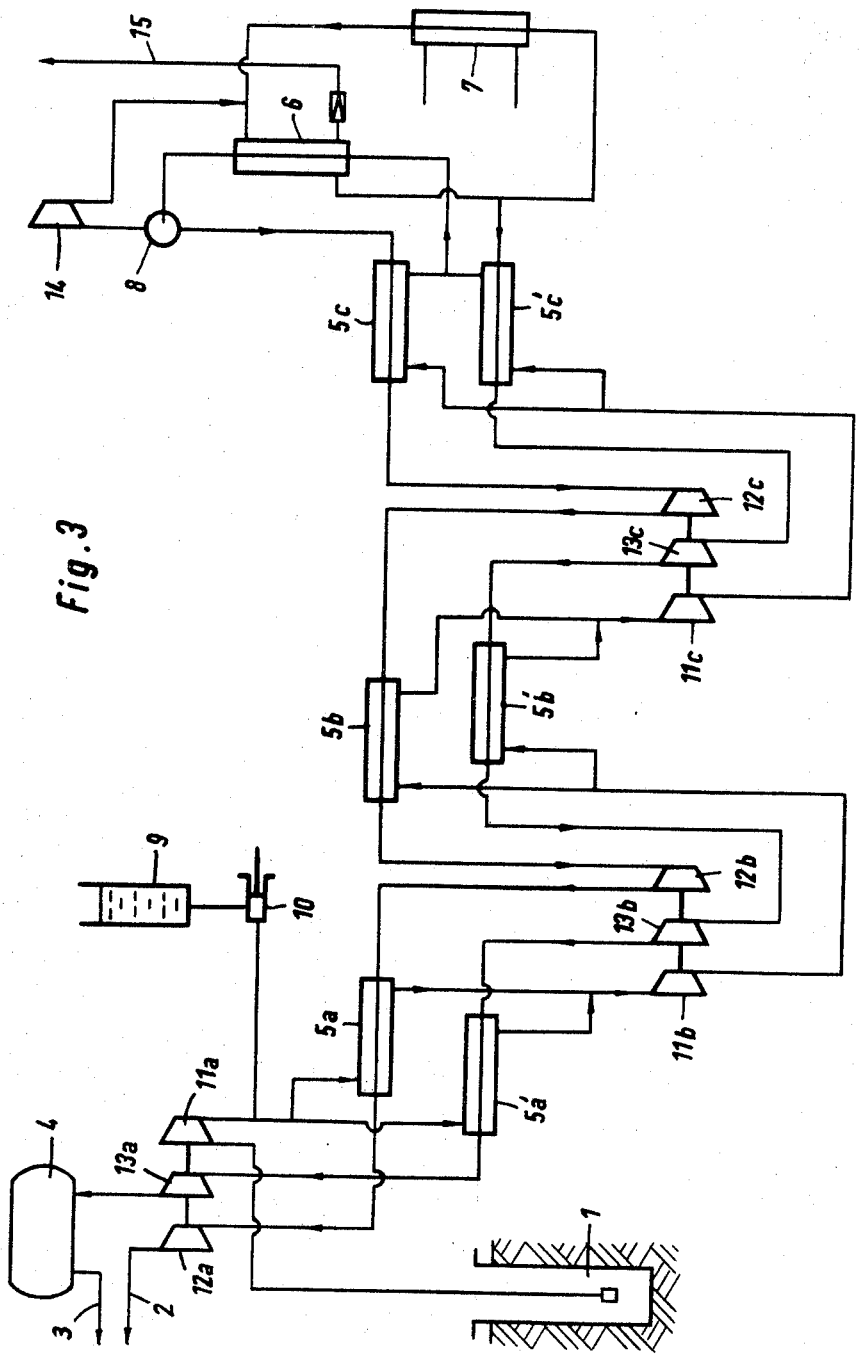
FIGURE 3 is a schematic representation of an embodiment of this invention, wherein pure water is produced from sea water in a plant of industrial size with a plurality of heat exchange stages and coupled pump-turbine-assemblies between the stages.

In FIGURE 3 the pump 11 according to FIGURE 2 is subdivided in pumps 11a, 11b and 11c.

The turbine 12 according to FIGURE 2 is subdivided in turbines 12a, 12b and 12c.

The turbine 13 according to FIGURE 2 is subdivided in turbines 13a, and 13b and 13c.

The heat exchanger 5 according to FIGURE 2 is subdivided in heat exchangers 5a, b and c for sea water/brine and 5a', b' and c' for sea water/pure water.

Between each two heat exchangers 5a/a' and b/b' or 5b/b' and c/c' respectively a pump-turbine assembly 11b, 12b, 13b or 11c, 12c, 13c is arranged respectively.

The pump-turbine system serving the utilization of the energy of compression, though being the most economical in most cases, can, of course, be replaced by any other pressure utilization system. Since the pumping work of a liquid pump is converted into kinetic energy and not PV work, it is suitable, in smaller plants, to allow the liquids to displace one another. They must merely be prevented, by a movable piston, a membrane, or an immiscible liquid, from mixing with each other. The liquid which does the displacing must have a pressure which is a little higher (about 3 atm.) than that of the liquid to be displaced. This pressure difference is represented, in the system of sea water/fresh water, by the vapor compressor. In the system of sea water/brine, this difference can readily be produced with the aid of a brine pump.

Figure 4:
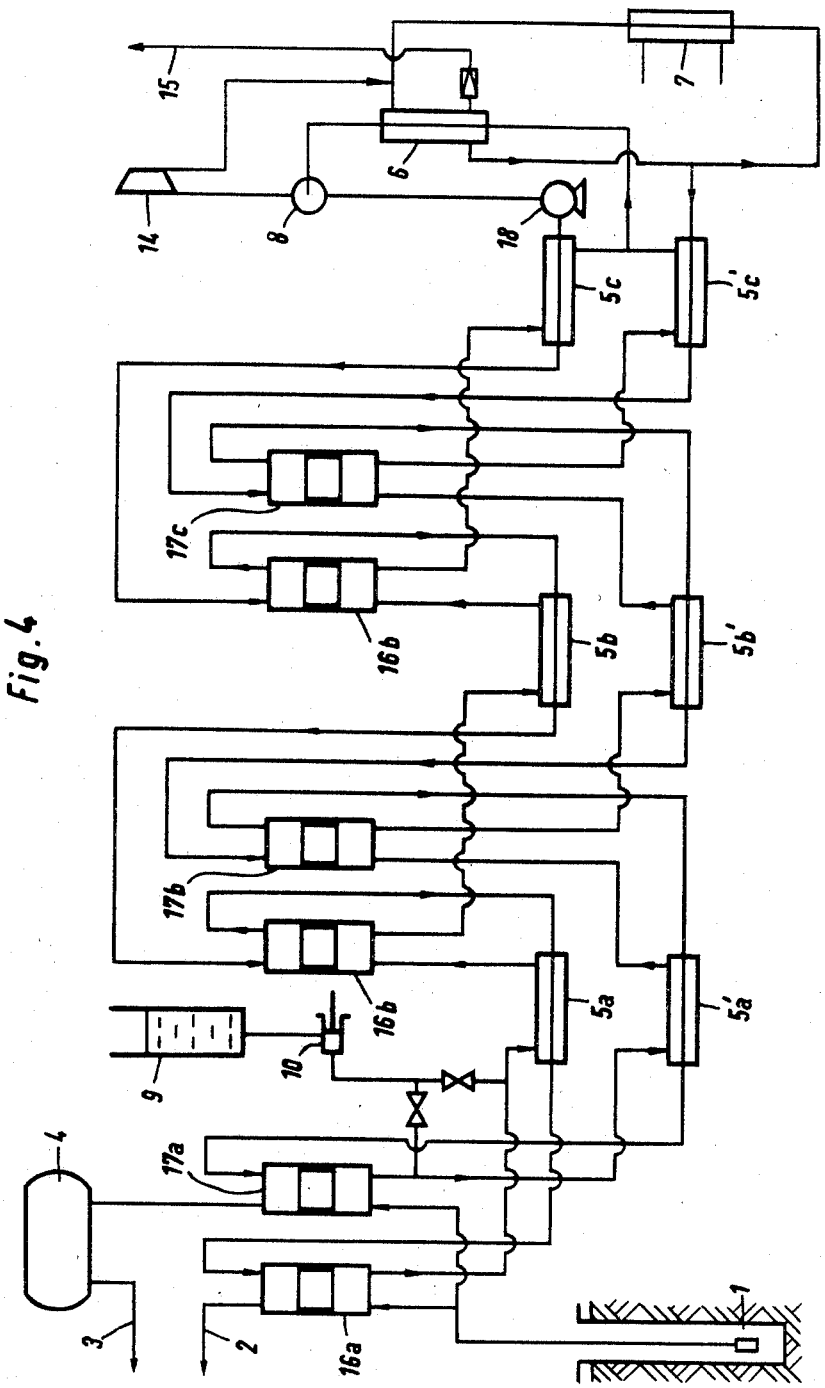
FIGURE 4 is an analogous representation of a plant of lower size with a plurality of heat exchange stages and liquid-liquid displacers between the stages.

In FIGURE 4 piston displacers 16a, b and c for pressure exchange between sea water and brine and 17a, b and c for pressure exchange between sea water and pure water respectively are arranged before heat exchangers 5a/a' and interposed between each two heat exchangers 5a/a' and b/b' or 5b/b' and c/c' respectively.

A brine pump 18 raises the pressure to the extent necessary for the compensation of losses in the piston-displacers 16a, b and c.

If the pressure of the vapor compressor 14 is not sufficient for displacing sea water by the pure water, another pump for pure water is used to raise the pressure to the necessary extent.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a vapor compression distillation process for recovering purified water from a solution containing water and dissolved solids, the improvement which comprises vaporizing a portion of said solution under a pressure of 80–200 atmospheres absolute, and compressing resultant vapor to a higher pressure sufficient to effect heat exchange between said solution under pressure and compressed vapor, and passing resultant compressed vapor in indirect heat exchange with said solution whereby heat from said compressed vapor is passed to said solution to conduct said vaporizing.

2. A process as defined by claim 1, wherein said solution is sea water.

3. A process as defined by claim 2, wherein separate streams of pure water and brine are withdrawn from the process, wherein at least one coupled pump-turbine is employed for lowering the pressure of at least one of said streams by passing same through said turbine and wherein said pump is employed to increase the pressure of raw sea water to the process operating pressure of 80–200 atmospheres absolute.

4. A process as defined by claim 3, wherein indirect heat exchange is conducted in parallel flow paths between sea water/brine and sea water/fresh water.

5. A process as defined by claim 2, wherein said vaporizing is conducted at about 160 atmospheres absolute.

6. A process as defined by claim 2 wherein separate streams of pure water and brine are withdrawn from the process, wherein a plurality of coupled pump-turbines are employed for lowering the pressure in stages of at least one of said streams by passing same serially through said turbines and wherein said pumps are employed to increase the pressure of raw sea water in stages to the vaporizing operating pressure of 80–200 atmospheres absolute by passing same serially through said pumps.

7. A process as defined by claim 6 wherein said coupled pump-turbines are employed for lowering the pressure of both of said streams by passing same through paralleled coupled turbines.

8. A process as defined by claim 2 wherein separate streams of pure water and brine are withdrawn from the process, wherein at least one piston displacer is employed for lowering the pressure of at least one of said streams by passing the same through said piston displacer and wherein said piston displacer is employed to increase the pressure of raw sea water to the vaporizing operating pressure of 80–200 atmospheres absolute.

9. A process as defined by claim 2 wherein separate streams of pure water and brine are withdrawn from the process, wherein a plurality of piston displacers are employed for lowering the pressure of at least one of said streams in stages by passing same through said piston displacers in series and wherein said piston displacers are employed to increase the pressure of raw sea water in stages to the vaporizing operating pressure of 80–200 atmospheres absolute by passing same serially through said piston displacers.

10. A process as defined by claim 9 wherein the pressure of both of said streams is lowered by passing the same through paralleled piston displacers.

11. A process as defined by claim 2 wherein said vaporizing is conducted at about 150–170 atmospheres absolute.

12. A process as defined by claim 2 wherein said vaporizing is conducted at about 155–165 atmospheres absolute.

References Cited

UNITED STATES PATENTS

| | | | |
|---|---|---|---|
| 1,204,716 | 11/1916 | Torssell | 203—24 |
| 2,520,186 | 8/1950 | Von Platen | 203—24 |
| 2,619,453 | 11/1952 | Andersen | 203—24 |
| 3,096,255 | 7/1963 | Redenbaugh | 203—23 |
| 3,243,359 | 3/1966 | Schmidt | 203—26 |
| 3,288,685 | 11/1966 | Kemper et al. | 203—23 |

WILBUR L. BASCOMB, Jr., Primary Examiner

U.S. Cl. X.R.

202—177; 203—4, 7, 22, 23, 24, 26, 100